United States Patent
Ko et al.

(10) Patent No.: US 12,141,397 B2
(45) Date of Patent: Nov. 12, 2024

(54) ELECTRONIC DEVICE INCLUDING TOUCH SENSOR AND METHOD FOR DRIVING TOUCH SENSOR INCLUDED IN ELECTRONIC DEVICE

(71) Applicant: Samsung Electronics Co., Ltd., Suwon-si (KR)

(72) Inventors: Seunghoon Ko, Suwon-si (KR); Bongjun Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 17/492,049

(22) Filed: Oct. 1, 2021

(65) Prior Publication Data

US 2022/0019332 A1 Jan. 20, 2022

Related U.S. Application Data

(63) Continuation of application No. PCT/KR2020/003272, filed on Mar. 9, 2020.

(30) Foreign Application Priority Data

Apr. 9, 2019 (KR) .................. 10-2019-0041606

(51) Int. Cl.
*G06F 3/041* (2006.01)
*G09G 3/20* (2006.01)

(52) U.S. Cl.
CPC .......... *G06F 3/04184* (2019.05); *G09G 3/20* (2013.01); *G09G 2320/0247* (2013.01); *G09G 2330/021* (2013.01); *G09G 2354/00* (2013.01)

(58) Field of Classification Search
None
See application file for complete search history.

(56) References Cited

U.S. PATENT DOCUMENTS 8,816,985 B1 * 8/2014 Tate .................. G06F 3/041661
345/173
10,571,995 B1 * 2/2020 Lee .......................... G06F 3/044
(Continued)

FOREIGN PATENT DOCUMENTS

JP 2016-066065 A 4/2016
JP 2017-016560 A 1/2017
(Continued)

OTHER PUBLICATIONS

European Search Report dated Mar. 24, 2022; European Appln. No. 20786918.1-1231 / 3940512 PCT/KR2020003272.
(Continued)

*Primary Examiner* — Benjamin C Lee
*Assistant Examiner* — Emily J Frank
(74) *Attorney, Agent, or Firm* — Jefferson IP Law, LLP

(57) ABSTRACT

An electronic device is provided. The electronic device includes a display, a display driver integrated circuit (IC) (DDI) configured to output a synchronization signal corresponding to update of a screen to be displayed on the display, and a touch circuit including a touch sensor and a touch sensor IC, wherein the touch sensor IC is configured to when a synchronization signal corresponding to a first display update frequency is received from the DDI, apply a first driving signal to the touch sensor on the basis of an interval in which the synchronization signal is applied, and when a synchronization signal corresponding to a second display update frequency is received from the DDI, apply a second driving signal to the touch sensor during a designated active interval.

15 Claims, 12 Drawing Sheets

(56) References Cited

U.S. PATENT DOCUMENTS

| | | | |
|---|---|---|---|
| 2009/0251445 A1 | 10/2009 | Ito et al. | |
| 2011/0050618 A1* | 3/2011 | Murphy | G06F 3/0446 |
| | | | 345/174 |
| 2012/0242570 A1* | 9/2012 | Kobayashi | G02B 27/0093 |
| | | | 345/156 |
| 2013/0069894 A1 | 3/2013 | Chen et al. | |
| 2014/0204041 A1* | 7/2014 | Munechika | G06F 3/04166 |
| | | | 345/212 |
| 2015/0145803 A1* | 5/2015 | Lee | G06F 3/0443 |
| | | | 345/174 |
| 2016/0070386 A1 | 3/2016 | Yamamoto et al. | |
| 2017/0010739 A1 | 1/2017 | Ito et al. | |
| 2017/0153736 A1 | 6/2017 | Kim et al. | |
| 2018/0090084 A1 | 3/2018 | Zheng et al. | |
| 2019/0025978 A1* | 1/2019 | Suyama | G02F 1/13338 |
| 2019/0094590 A1* | 3/2019 | Aoki | G09G 3/36 |
| 2019/0204971 A1* | 7/2019 | Kang | G06F 3/0416 |
| 2019/0265859 A1* | 8/2019 | Lin | G06F 3/04166 |

FOREIGN PATENT DOCUMENTS

| | | | |
|---|---|---|---|
| KR | 10-2016-0092607 A | 8/2016 | |
| KR | 10-2017-0064599 A | 6/2017 | |
| KR | 10-2017-0073072 A | 6/2017 | |

OTHER PUBLICATIONS

Korean Office Action with English translation dated Feb. 21, 2024; Korean Appln. No. 10-2019-0041606.

* cited by examiner

ELECTRONIC DEVICE INCLUDING TOUCH SENSOR AND METHOD FOR DRIVING TOUCH SENSOR INCLUDED IN ELECTRONIC DEVICE

CROSS-REFERENCE TO RELATED APPLICATION(S)

This application is a continuation application, claiming the priority under § 365(c), of an International application No. PCT/KR2020/003272, filed on Mar. 9, 2020, which is based on and claims the benefit of a Korean patent application number 10-2019-0041606, filed on Apr. 9, 2019, in the Korean Intellectual Property Office, the disclosure of which is incorporated by reference herein in its entirety.

BACKGROUND

1. Field

The disclosure relates to an electronic device including a touch sensor and a touch sensor included in the electronic device. More particularly, the disclosure relates to an electronic device and a method for driving a touch sensor included in the electronic device, a touch sensor integrated circuit (IC) may apply, to the touch sensor, a driving signal different from that when a synchronization signal corresponding to a first display update frequency is received from the display driver IC (DDI).

2. Description of Related Art

Electronic devices including a display device for displaying screens are in widespread use. An electronic device including a display device may include a display and a display driver integrated circuit (IC) (DDI) for controlling the display.

Further, as the preference for touch sensors becomes a trend, electronic devices having built-in touch circuitry are commonplace. Touch circuitry may include touch sensors for sensing touch inputs and a touch sensor IC for controlling the touch sensors.

In an electronic device including a display device and touch circuitry, a DDI included in the display device may transmit a synchronization signal to the touch sensor IC included in the touch circuitry. Based on the synchronization signal, the touch sensor IC may drive the touch sensors to avoid a period during which noise is generated due to interference from the display.

The above information is presented as background information only to assist with an understanding of the disclosure. No determination has been made, and no assertion is made, as to whether any of the above might be applicable as prior art with regard to the disclosure.

SUMMARY

Electronic devices of the related art may reduce the update frequency of the display when a still screen or always on display (AOD) is output from the display. When a still screen or AOD is output from the display, the user's touch input would be less likely. However, electronic devices of the related art do not change the scheme of driving the touch sensors despite a less chance of the user's touch input, thus causing unnecessary power consumption.

Aspects of the disclosure are to address at least the above-mentioned problems and/or disadvantages and to provide at least the advantages described below. Accordingly, an aspect of the disclosure is to provide an electronic device and a method for driving a touch sensor included in the electronic device, a touch sensor integrated circuit (IC) may apply, to the touch sensor, a driving signal different from that when a synchronization signal corresponding to a first display update frequency is received from the display driver IC (DDI), when a synchronization signal corresponding to a second display update frequency, which is lower than the first display update frequency, is received from the DDI.

Additional aspects will be set forth in part in the description which follows and, in part, will be apparent from the description, or may be learned by practice of the presented embodiments.

In accordance with an aspect of the disclosure, an electronic device is provided. The electronic device includes a display, a DDI configured to output a synchronization signal corresponding to an update of a screen to be displayed on the display, and a touch circuit including a touch sensor and a touch sensor IC. The touch sensor IC may be configured to apply a first driving signal to the touch sensor, based on a period in which a synchronization signal corresponding to a first display update frequency is applied, when the synchronization signal is received from the DDI, and apply a second driving signal to the touch sensor, during a designated active period, when a synchronization signal corresponding to a second display update frequency is received from the DDI.

In accordance with another aspect of the disclosure, a method for driving a touch sensor is provided. The method includes applying a first driving signal to the touch sensor, based on a period in which a synchronization signal corresponding to a first display update frequency is applied, when the synchronization signal is received and applying a second driving signal to the touch sensor, during a designated active period, when a synchronization signal corresponding to a second display update frequency is received.

In accordance with another aspect of the disclosure, an electronic device and a method for driving a touch sensor included in the electronic device are provided. The touch sensor IC may apply, to the touch sensor, a driving signal different from that when a synchronization signal corresponding to a first display update frequency is received from the DDI, when a synchronization signal corresponding to a second display update frequency, which is lower than the first display update frequency, is received from the DDI.

Since the driving signal applied to the touch sensor changes according to the change in the display update frequency, unnecessary power consumption may be prevented while maintaining the performance of the touch sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
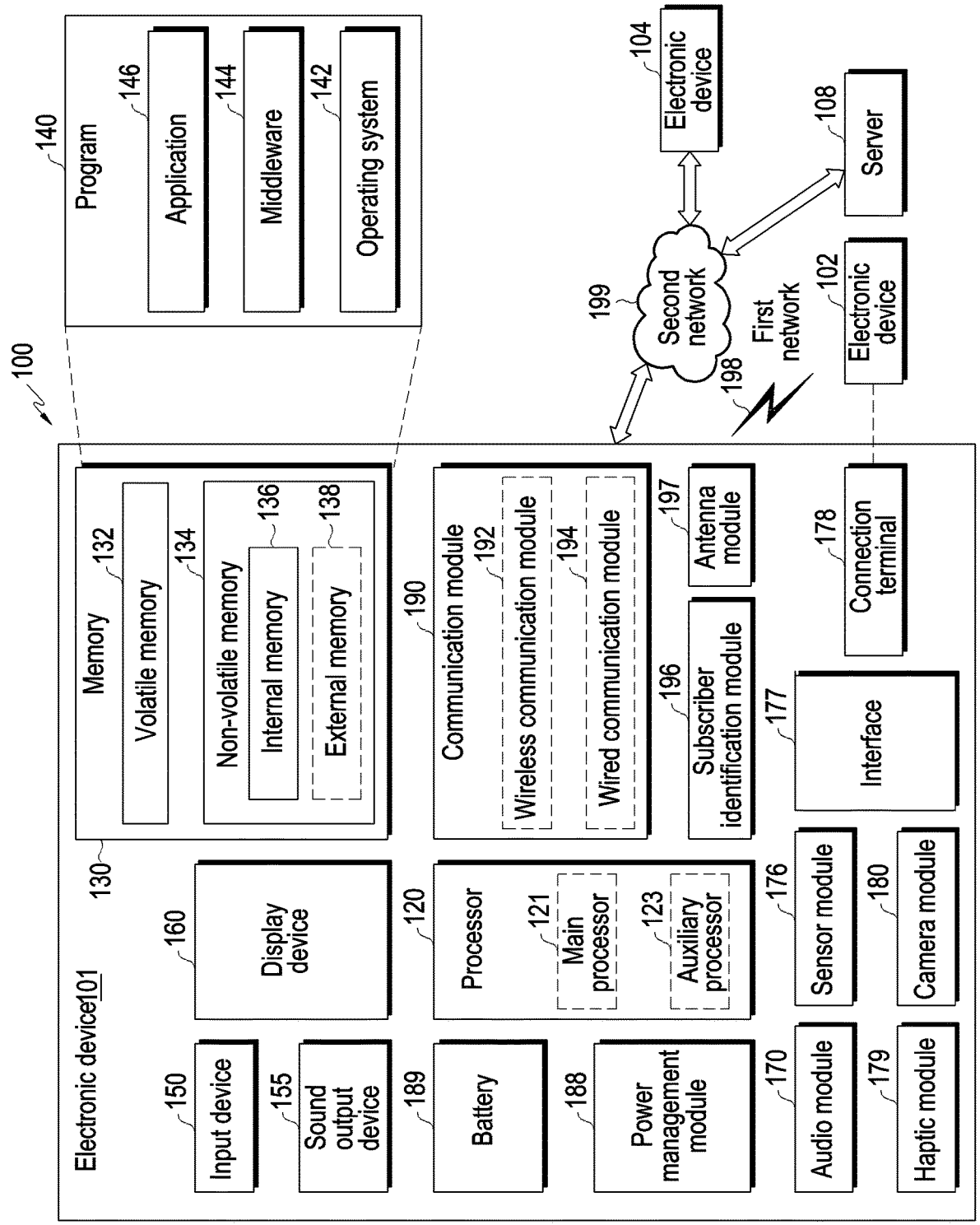
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment of the disclosure, the antenna module may include one antenna including a radiator formed of a conductor or conductive pattern formed on a substrate (e.g., a printed circuit board (PCB)). According to an embodiment of the disclosure, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
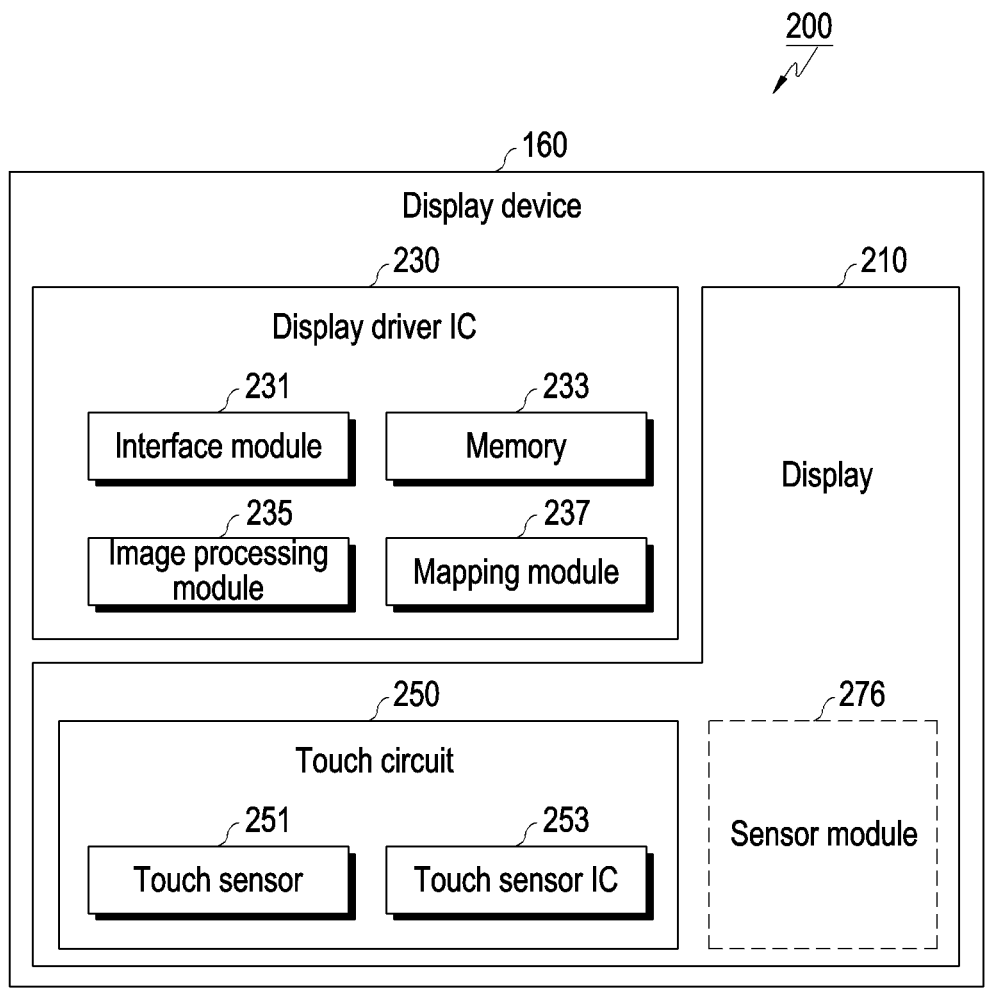
FIG. 2 is a block diagram illustrating a display device according to an embodiment of the disclosure.

FIG. 2 is a block diagram 200 illustrating a display device according to an embodiment of the disclosure.

Referring to FIG. 2, the display device 160 may include a display 210 and a display driver integrated circuit (DDI) 230 to control the display 110. The DDI 230 may include an interface module 231, a memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment of the disclosure, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with a touch circuit 250 or the sensor module 276 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 135. According to an embodiment of the disclosure, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment of the disclosure, the display device 160 may further include the touch circuit 250. The touch circuit 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor 120. According to an embodiment of the disclosure, at least part (e.g., the touch sensor IC 253) of the touch circuit 250 may be formed as part of the display 210 or the DDI 230, or as part of another component (e.g., the auxiliary processor 123) disposed outside the display device 160.

According to an embodiment of the disclosure, the display device 160 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuit 250)) of the display device 160. For example, when the sensor module 276 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display device 160 includes a pressure sensor, the pressure sensor may obtain pressure information corresponding to a touch input received via a partial or whole area of the display 210. According to an embodiment of the disclosure, the touch sensor 251 or the sensor module 276 may be disposed between pixels in a pixel layer of the display 210, or over or under the pixel layer.

Figure 3:
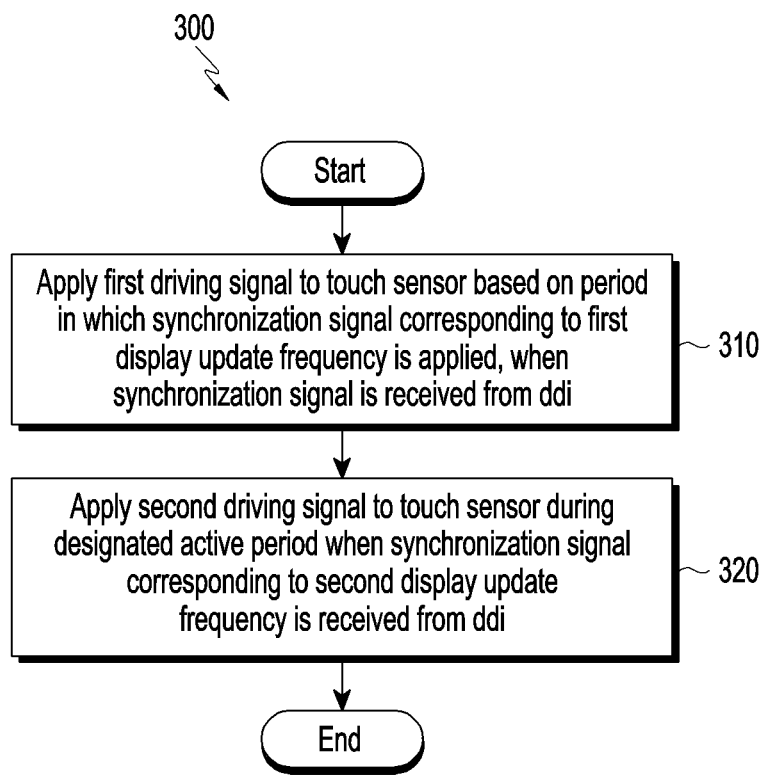
FIG. 3 is a flowchart illustrating operations of an electronic device according to an embodiment of the disclosure.
Figure 4A:
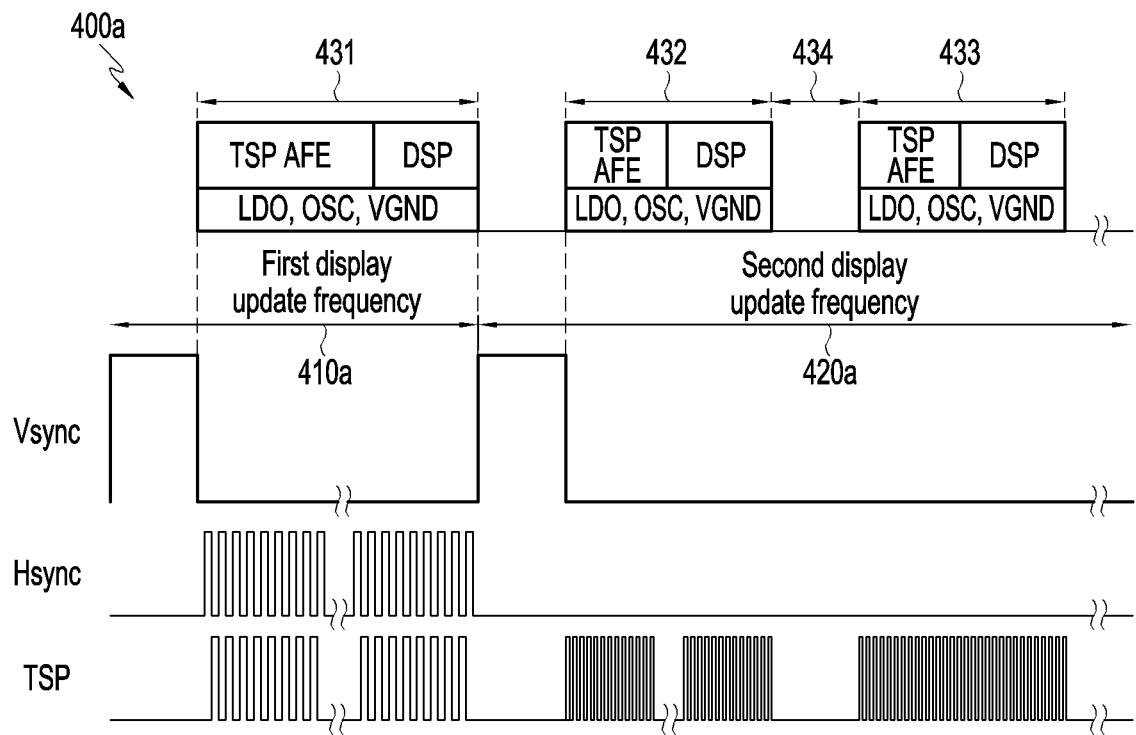
FIG. 4A illustrates signals for describing operations of a touch circuit included in an electronic device according to an embodiment of the disclosure.
Figure 4B:
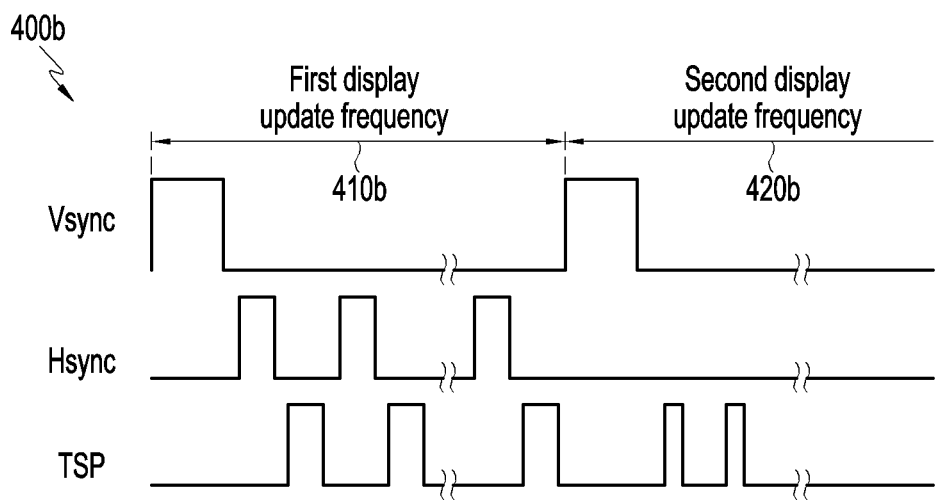
FIG. 4B illustrates signals for describing operations of a touch circuit included in an electronic device according to an embodiment of the disclosure.
Figure 4C:
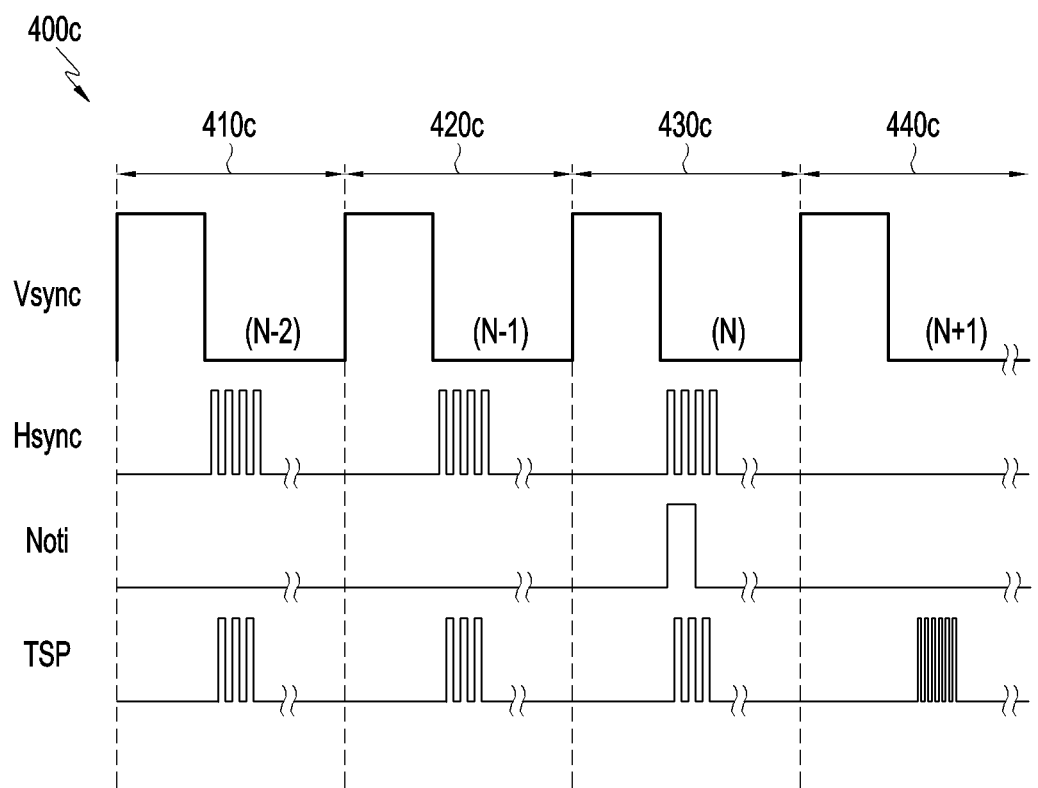
FIG. 4C illustrates signals for describing operations of a touch circuit included in an electronic device according to an embodiment of the disclosure.

FIG. 3 is a flowchart illustrating operations of an electronic device according to an embodiment of the disclosure. FIG. 4A illustrates signals 400a for describing operations of a touch circuit included in an electronic device according to an embodiment of the disclosure. FIG. 4B illustrates signals 400b for describing operations of a touch circuit included in an electronic device according to an embodiment of the disclosure. FIG. 4C illustrates signals 400c for describing operations of a touch circuit included in an electronic device according to an embodiment of the disclosure. Hereinafter, the operations 300 illustrated in FIG. 3 are described with reference to FIGS. 4A and 4B.

Referring to FIG. 3, the operations 300 may be performed by a touch sensor IC (e.g., the touch sensor IC 253) included in a display device (e.g., the display device 160) of an electronic device (e.g., the electronic device 101).

In operation 310, the touch sensor IC (e.g., the touch sensor IC 253) included in the display device (e.g., the display device 160) of the electronic device (e.g., the electronic device 101) may apply a first driving signal to a touch sensor (e.g., the touch sensor 251) based on a period during which a synchronization signal is applied, when the synchronization signal corresponding to a first display update frequency is received from a DDI (e.g., the display driver IC 230).

Although the touch circuit 250 including the touch sensor 251 and the touch sensor IC 253 is illustrated as included in the display 210 in FIG. 2, according to various embodiments of the disclosure, the touch circuit 250 may be implemented separately from the display 210.

According to various embodiments of the disclosure, the first display update frequency may be an update frequency of a screen to be displayed on the display 210 included in the display device 160 of the electronic device 101. For example, the first display update frequency may be 60 Hz.

Referring to FIG. 4A, synchronization signals received from the DDI 230 by the touch sensor IC 253 may include a vertical synchronization signal Vsync and a horizontal synchronization signal Hsync. Although not illustrated in FIG. 4A, the synchronization signals received from the DDI 230 by the touch sensor IC 253 may further include at least one of a data enable (DE) signal or a tearing effect (TE) signal. The driving signal applied to the touch sensor 251 by the touch sensor IC 253 is denoted by TSP.

According to various embodiments of the disclosure, in a first period 410a in which the update frequency of the screen to be displayed on the display 210 is the first display update frequency, a first driving signal, which is the driving signal TSP in the first period 410a, may be applied to the touch sensor 251. According to various embodiments of the disclosure, the first driving signal may be a signal based on a period in which the synchronization signals (Vsync and Hsync) in the first period 410a are applied.

Referring to FIG. 4B, in a first period 410b in which the update frequency of the screen to be displayed on the display 210 is the first display update frequency, the pulses of the driving signal TSP may not overlap the pulses of the synchronization signals Vsync and Hsync.

Referring back to FIG. 4A, during a period 431 between the pulses of the vertical synchronization signal Vsync in the first period 410a, the analog signal received by a touch-screen panel analog front end (TSP AFE) may be converted into a digital signal. The analog front end may include a capacitor, a switch, a resistor, an amplifier, a sampling and holder, and an analog-to-digital converter (ADC), and the analog front end is not limited to a specific implementation form. For example, the voltage corresponding to the charge charged in the capacitor may be sampled and then held for a predetermined period by the sampling and holder. The ADC may convert the sampled signal into digital data and output it. Thereafter, digital signal processing (DSP) may be performed on the digital data. During the period 431 in which digital conversion and DSP are performed by the TSP AFE, a low drop regulator (LDO) for supplying a power source voltage, an oscillator (OSC) for providing a reference clock, and a virtual ground generator (VGND) for supplying a ½ power source voltage may operate.

In operation 320, when a synchronization signal corresponding to a second display update frequency is received from the DDI 230, the touch sensor IC 253 may apply a second driving signal to the touch sensor 251 during a designated active period. The touch sensor IC 253 may not apply the second driving signal to the touch sensor 251 during a dormant period. According to various embodiments of the disclosure, the second display update frequency may be a display update frequency when the screen to be displayed on the display 210 is a still screen or an always on display (AOD). According to various embodiments of the disclosure, the second display update frequency may be less than the first display update frequency. For example, when the first display update frequency is 60 Hz, the second display update frequency may be 1 Hz.

According to various embodiments of the disclosure, the driving signal applied to the touch sensor 251 by the touch sensor IC 253 may be different for a plurality of different areas in the screen of the same display 210.

According to various embodiments of the disclosure, when a plurality of windows are displayed on the screen of the display 210, the driving signal may be identified according to the type of application corresponding to each window. In other words, when a first window and a second window are displayed on the screen of the display 210, and an execution screen of the first application is displayed on the first window and an execution screen of the second application is displayed on the second window, the driving signal corresponding to the first window may be determined according to the type of the first application, and the driving signal corresponding to the second window may be identified according to the type of the second application. For example, when the first application is an Internet application and the second application is a pen-related application, the driving signal corresponding to the second window may have a higher frequency, e.g., two times higher, than the driving signal corresponding to the first window.

According to various embodiments of the disclosure, when a plurality of windows are displayed on the screen of the display 210, the driving signal may be identified depending on whether each window is activated. For example, when a first window and a second window are displayed on the screen of the display 210, and the first window is activated, but the second window is not activated, the driving signal corresponding to the first window may have a higher frequency than the driving signal corresponding to the second window.

According to various embodiments of the disclosure, when a pop-up area is displayed on the screen of the display 210, the driving signal corresponding to the pop-up area may have a lower frequency than the driving signal corresponding to the area except for the pop-up area of the screen of the display 210.

According to various embodiments of the disclosure, when an AOD is displayed on the screen of the display 210, and one or more icons are included in the AOD, the driving signal corresponding to the area in which one or more icons are displayed on the screen of the display 210 is not 0, and the driving signal corresponding to an area except for the area in which the one or more icons are displayed on the screen of the display 210 may be 0.

Referring to FIG. 4A, during designated active periods 432 and 433 in the second period 420a which is the update frequency of the screen to be displayed on the display 210 is the second display update frequency, the second driving signal which is the driving signal TSP in the second period 420a may be applied to the touch sensor 251. According to various embodiments of the disclosure, digital conversion and DSP may be performed in the active periods 432 and 433 and, during the periods, the LDO, OSC, and VGND may operate. In the dormant period 434, digital conversion and DSP are not performed, and the LDO, OSC, and VGND may not operate. In the first period 410a, the LDO, OSC, and VGND operate throughout the period 431 between pulses of the vertical synchronization signal Vsync, while in the second period 420a, the LDO, OSC, and VGND operate only in the active periods 432 and 433 of the period between the pulses of the vertical synchronization signal Vsync and the LDO, OSC, and VGND do not operate in the dormant period 434. Thus, power consumption in the second period 420a may be less than power consumption in the first period 410a.

According to various embodiments of the disclosure, in the active periods 432 and 433, the frequency of the second driving signal may be higher than the frequency of the first driving signal. Referring to FIG. 4A, it is illustrated that the time interval between adjacent pulses of the driving signal TSP in the active periods 432 and 433 of the second period 420b is shorter than the time interval between adjacent pulses of the driving signal TSP in the first period 410a. Further, referring to FIG. 4B, it is illustrated that the time interval between adjacent pulses of the driving signal TSP in the second period 420b is shorter than the time interval between adjacent pulses of the driving signal TSP in the first period 410b. Since the frequency of the driving signal TSP in the active periods 432 and 433 of the second period 420a is higher than the frequency in the first period 410 although there is the dormant period 434, in which digital conversion and DSP are not performed, in the second period 420a, the performance of the touch sensor 251 may be maintained.

Although not illustrated in FIG. 3, according to various embodiments of the disclosure, the touch sensor IC 253 may receive a first signal indicating that the synchronization signals (Vsync and Hsync) are to be changed to a second synchronization signal corresponding to the second display update frequency before operation 320. Referring to FIG. 4C, the signal indicating, to the touch sensor IC 253, that the synchronization signals Vsync and Hsync are to be changed to the second synchronization signal corresponding to the second display update frequency may be denoted as Noti. FIG. 4C illustrates a situation in which the touch sensor IC 253 receives a first signal in an Nth frame. A first signal in which a Noti signal is 0 in an N−2th frame 410c and an N−1th frame 420c, and the Noti signal is not 0 in an Nth frame 430c may be received by the touch sensor IC 253. Thereafter, a second driving signal, as the driving signal TSP, may be applied to the touch sensor 251 in an N+1th frame 440c.

Referring to FIG. 4C, it is illustrated that the frequency of the driving signal TSP in the N+1th frame 440c is higher than the frequency of the driving signal TSP in the N−2th frame 410c to the Nth frame 430c.

According to various embodiments of the disclosure, the first signal may be transmitted to the touch sensor IC 253 by a processor (e.g., the processor 120) that identifies that the screen to be displayed on the display 210 is a still screen or AOD. According to various embodiments of the disclosure, the processor 120 may be an application processor. Alternatively, according to various embodiments of the disclosure, the first signal may be transmitted to the touch sensor IC 253 by the DDI 230 that receives a signal indicating that the screen to be displayed on the display 210 is a still screen or AOD or a signal requesting to change display update from the processor 120.

According to various embodiments of the disclosure, the touch sensor IC 253 may identify that the horizontal synchronization signal Hsync included in the synchronization signal received from the DDI 230 is not received during a predetermined first time period and identify that the synchronization signal has been changed to correspond to the second display update frequency based on identifying that the horizontal synchronization signal Hsync included in the synchronization signal received from the DDI 230 is not received during the predetermined first time period. According to various embodiments of the disclosure, the touch sensor IC 253 may apply a second driving signal, as a driving signal, to the touch sensor 251 from a next frame after identifying that the synchronization signal has been changed to correspond to the second display update frequency.

Figure 5:
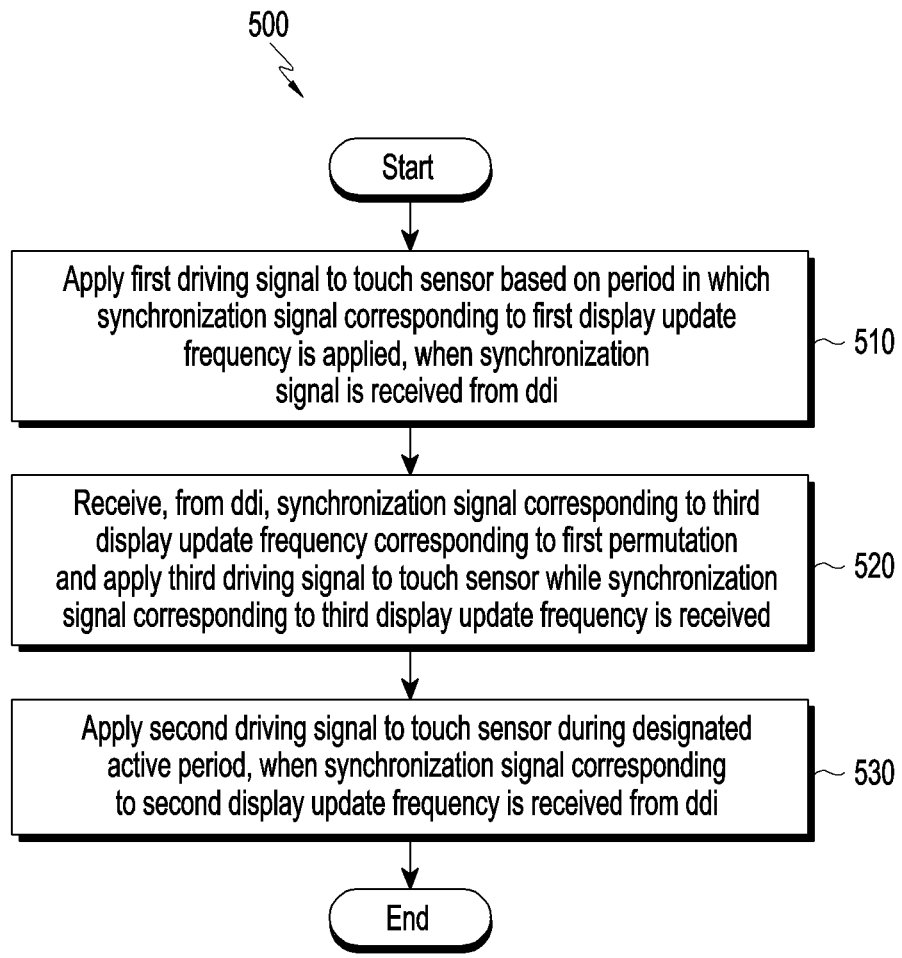
FIG. 5 is a flowchart illustrating operations of an electronic device according to an embodiment of the disclosure.
Figure 6:
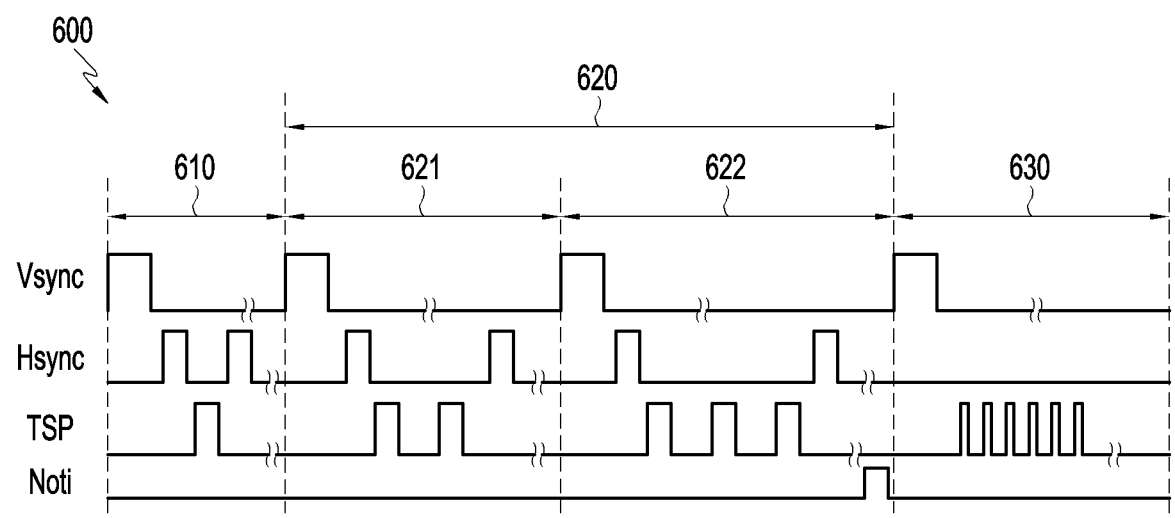
FIG. 6 illustrates signals for describing operations of a touch circuit included in an electronic device according to an embodiment of the disclosure.

FIG. 5 is a flowchart 500 illustrating operations of an electronic device according to an embodiment of the disclosure. FIG. 6 illustrates signals 600 for describing operations of a touch circuit included in an electronic device according to an embodiment of the disclosure. Specifically, while FIGS. 3 and 4A to 4C illustrate an example in which the update frequency of the screen to be displayed on the display 210 is changed to the second display update frequency immediately after the period in which the screen update frequency is the first display update frequency, FIGS. 5 and 6 illustrate an example in which the update frequency of the screen to be displayed on the display 210 is changed to the second display update frequency immediately through a period of a third display update frequency after the period of the first display update frequency.

Referring to FIG. 5, in operation 510, the touch sensor IC (e.g., the touch sensor IC 253) included in the display device (e.g., the display device 160) of the electronic device (e.g., the electronic device 101) may apply a first driving signal to a touch sensor (e.g., the touch sensor 251) based on a period during which a synchronization signal is applied, when the synchronization signal corresponding to a first display update frequency is received from a DDI (e.g., the display driver IC 230). The details of operation 510 are the same as those described above with reference to operation 310, and no repetitive description thereof is given below.

In operation 520, the touch sensor IC 253 may receive a synchronization signal corresponding to the third display update frequency corresponding to a first permutation from the DDI 230 and, while the synchronization signal corresponding to the third display update frequency is received, may apply the third driving signal to the touch sensor 251. According to various embodiments of the disclosure, the first permutation may be a decreasing permutation of at least one of integers that are divisors of a first integer corresponding to the first display update frequency and are greater than a second integer that corresponds to the second display update frequency. For example, when the first display update frequency is 60 Hz and the second display update frequency is 1 Hz, the first permutation may be a decreasing permutation, e.g., 30, 20, 12, 10, 6, 5, 3, 2, or 30 and 20, which are at least one of integers that are divisors of 60, which is the first integer corresponding to the first display update frequency, and are greater than 1, which is the second integer corresponding to the second display update frequency.

FIG. 6 illustrates synchronization signals Vsync and Hsync and a driving signal TSP in an example where the first display update frequency is 60 Hz, and the second display update frequency is 1 Hz, and the first permutation is 30 and 20. FIG. 6 also illustrates a signal Noti indicating that the synchronization signals Vsync and Hsync are to be changed to the second synchronization signal corresponding to the second display update frequency. In the example of FIG. 6, the third display update frequency is 30 Hz and 20 Hz.

Referring to FIG. 6, the synchronization signals Vsync and Hsync correspond to 60 Hz, which is the first display update frequency, in a first period 610, and the synchronization signals Vsync and Hsync correspond to 30 Hz and 20 Hz, respectively, which are the third display update frequencies, in a first frame 621 and a second frame 622 of a third period 620.

According to various embodiments of the disclosure, the third driving signal which is the driving signal TSP applied to the touch sensor 251 by the touch sensor IC 253 during the third period 620 during which the synchronization signals Vsync and Hsync corresponding to the third display update frequency are received may have the same frequency as the first driving signal. FIG. 6 illustrates an example in which the time interval between adjacent pulses of the driving signal TSP in the first period 610 is identical to the time interval between adjacent pulses of the driving signal TSP in the first frame 621 and second frame 622 of the third period 620.

In operation 530, the touch sensor IC 253 may apply a second driving signal to the touch sensor 251 during a designated active period in the second period 630 during which the synchronization signal corresponding to the second display update frequency is received from the DDI 230. The touch sensor IC 253 may stop applying the second driving signal in a dormant period. The details of operation 530 are the same as those described above with reference to operation 320, and no repetitive description thereof is given below.

According to various embodiments of the disclosure, as illustrated in FIG. 6, the touch sensor IC 253 may receive a signal Noti indicating that the synchronization signals Vsync and Hsync, as the second synchronization signals are to be received as second synchronization signals corresponding to the second display update frequency, before the synchronization signal corresponding to the second display update frequency is received from the DDI 230. According to various embodiments of the disclosure, the touch sensor IC 253 may identify that the synchronization signal has been changed to correspond to the second display update frequency based on identifying that the horizontal synchronization signal Hsync received from the DDI 230 is not received during a predetermined first time interval and may apply the second driving signal, as a driving signal, to the touch sensor 251 from a next frame.

In the embodiment illustrated in FIGS. 5 and 6, as compared with the embodiment illustrated in FIGS. 3 and 4A to 4C, the update frequency of the screen to be displayed on the display 210 is not directly changed from the first display update frequency to the second display update frequency but is changed from the first display update frequency through the third display update frequency to the second display update frequency. Accordingly, as compared to the embodiment illustrated in FIGS. 3 and 4A to 4C, the user of the electronic device may feel less flickering of the screen.

Figure 7:
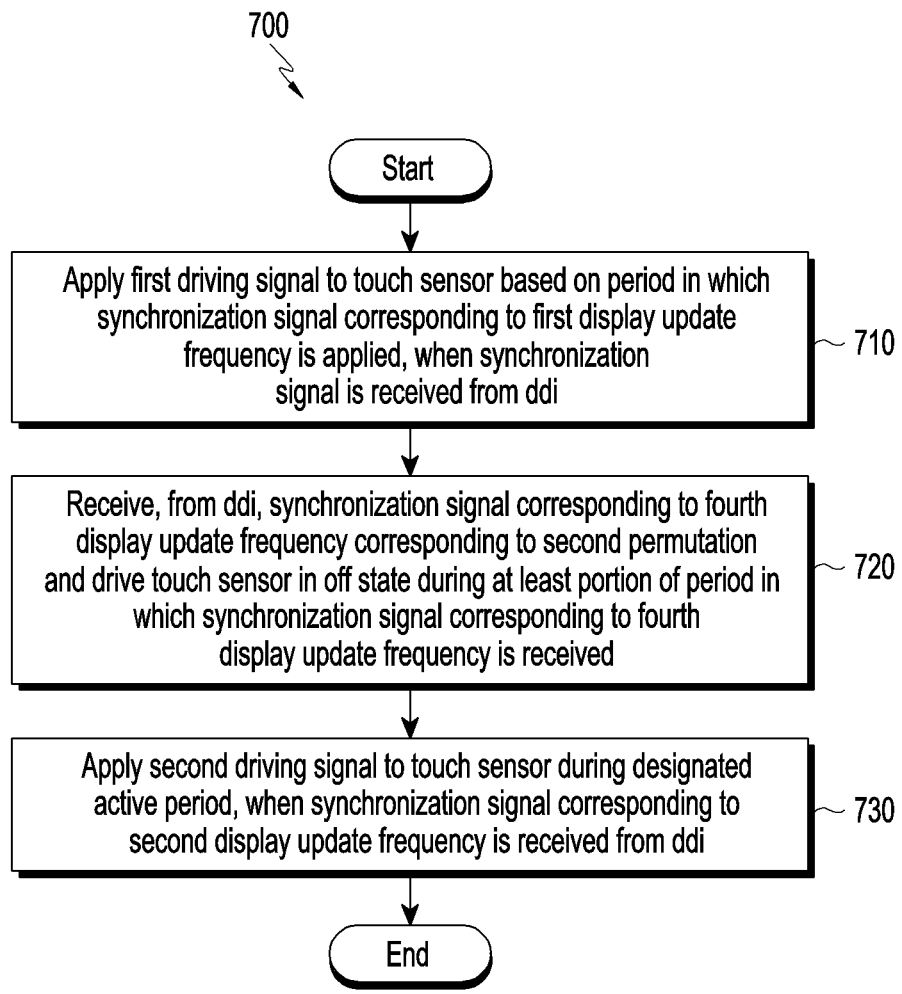
FIG. 7 is a flowchart illustrating operations of an electronic device according to an embodiment of the disclosure.
Figure 8:
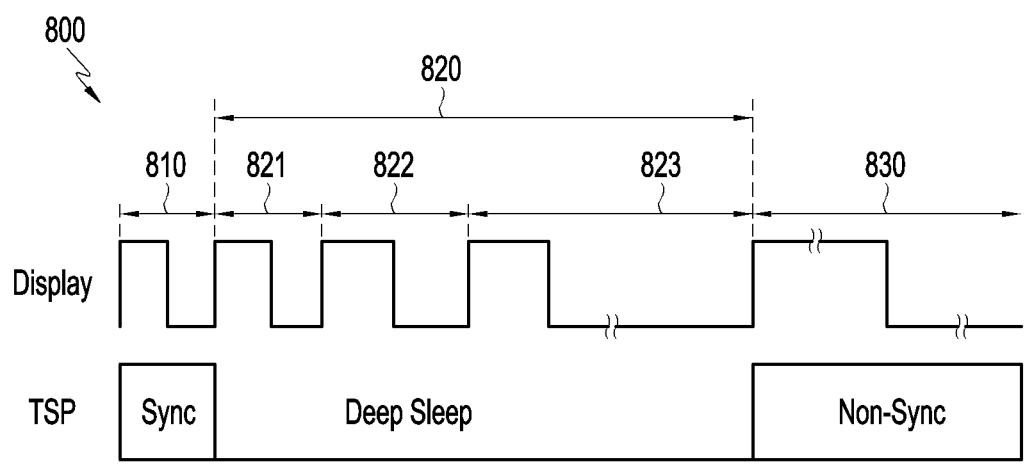
FIG. 8 illustrates a driving state of a display and a driving state of a touch sensor for describing operations of a touch circuit included in an electronic device, according to an embodiment of the disclosure.

FIG. 7 is a flowchart 700 illustrating operations of an electronic device according to an embodiment of the disclosure. FIG. 8 is a view 800 illustrating a driving state of a display and a driving state of a touch sensor for describing operations of a touch circuit included in an electronic device, according to an embodiment of the disclosure. Specifically, while FIGS. 3 and 4A to 4C illustrate an example in which the update frequency of the screen to be displayed on the display 210 is changed to the second display update frequency immediately after the period in which the screen update frequency is the first display update frequency, FIGS. 7 and 8 illustrate an example in which the update frequency of the screen to be displayed on the display 210 is changed to the second display update frequency immediately through a period of a fourth display update frequency after the period of the first display update frequency.

Referring to FIG. 7, in operation 710, the touch sensor IC (e.g., the touch sensor IC 253) included in the display device (e.g., the display device 160) of the electronic device (e.g., the electronic device 101) may apply a first driving signal to a touch sensor (e.g., the touch sensor 251) based on a period during which a synchronization signal is applied, when the synchronization signal corresponding to a first display update frequency is received from a DDI (e.g., the DDI 230). The details of operation 710 are the same as those described above with reference to operation 310, and no repetitive description thereof is given below.

In operation 720, the touch sensor IC 253 may receive a synchronization signal corresponding to the fourth display update frequency corresponding to a second permutation from the DDI 230 and, during at least a portion of the period during which the synchronization signal corresponding to the fourth display update frequency is received, may drive the touch sensor 251 in an off state. According to various embodiments of the disclosure, the second permutation may be a decreasing permutation of a plurality of integers that start with a third integer less than the first integer corresponding to the first display update frequency and end with a fourth integer less than the third integer and greater than the second integer corresponding to the second display update frequency. According to various embodiments of the disclosure, the second permutation may be a permutation, decreasing at uneven intervals, of the plurality of integers that start with the third integer less than the first integer corresponding to the first display update frequency and end with the fourth integer less than the third integer and greater than the second integer corresponding to the second display update frequency. According to various embodiments of the disclosure, the second permutation may be a permutation decreasing at equal intervals of a plurality of integers. For example, when the first display update frequency is 60 Hz, and the second display update frequency is 1 Hz, the second permutation may be a permutation, decreasing at equal intervals, of a plurality of integers that start with the third integer less than 60, which is the first integer corresponding to the first display update frequency, and end with the fourth integer less than the third integer and greater than 1, which is the second integer corresponding to the second display update frequency. In this example, the second permutation may be 58, 56, 54, . . . , 4, and 2 or 56, 52, 48, . . . , 8, and 4.

FIG. 8 illustrates the driving state Display of the display 210 and the driving state TSP of the touch sensor 251 in the example in which the first display update frequency is 60 Hz and the second display update frequency is 1 Hz, and the second permutation is 56, 52, 48, . . . , 8, and 4. In the example of FIG. 8, a fourth display update frequency is 56 Hz, 52 Hz, 48 Hz, . . . , 8 Hz, or 4 Hz.

Referring to FIG. 8, the update frequency of the display 210 in the first period 810 is 60 Hz, which is the first display update frequency. The update frequencies of the display 210 in the first frame 821 and the second frame 822 of the fourth period 820 are 56 Hz and 52 Hz, respectively. It will be readily appreciated by one of ordinary skill in the art that in the remaining period 823 except for the first frame 821 and the second frame 822 of the fourth period 820, although some periods are omitted for convenience of illustration, the update frequency of the display 210 will be sequentially changed in the order of 48 Hz, . . . , 8 Hz, and 4 Hz.

The touch sensor IC 253 may drive the touch sensor 251 in an off state during at least a portion of the period in which a synchronization signal corresponding to the fourth display update frequency is received. Although FIG. 8 illustrates that the touch sensor 251 is driven in the off state throughout the period in which the synchronization signal corresponding to the fourth display update frequency is received, that is, the fourth period 820, embodiments of the disclosure are not limited thereto. An example in which the touch sensor IC 253 drives the touch sensor 251 in an off state during a portion of the period during which the synchronization signal corresponding to the fourth display update frequency is received is described below reference to FIGS. 9 and 10. Interference in driving between the touch sensor 251 and the display 210 may be prevented while the touch sensor IC 253 drives the touch sensor 251 in an off state.

In operation 730, when a synchronization signal corresponding to a second display update frequency is received from the DDI 230, the touch sensor IC 253 may apply a second driving signal to the touch sensor during a designated active period. The details of operation 730 are the same as those described above with reference to operation 320, and no repetitive description thereof is given below.

Referring to the driving state TSP of the touch sensor 251 illustrated in FIG. 8, as described above in connection with operation 310, in the first period 810, the touch sensor 251 may be driven by the first driving signal which is based on a synchronization signal (Sync) and, in the second period 830, driven (Non-Sync) by the second driving signal as described above in connection with operation 320 and, in the fourth section 820, driven in the off state (Deep Sleep). According to various embodiments of the disclosure, in at least a portion of the fourth period 820, the touch sensor 251 is in an on state, and at least one of the touch sensor IC 253 or the processor 120 may not change, into coordinates, the signal based on a touch input detected by the touch sensor 251 while the touch sensor 251 is in the on state.

Figure 9:
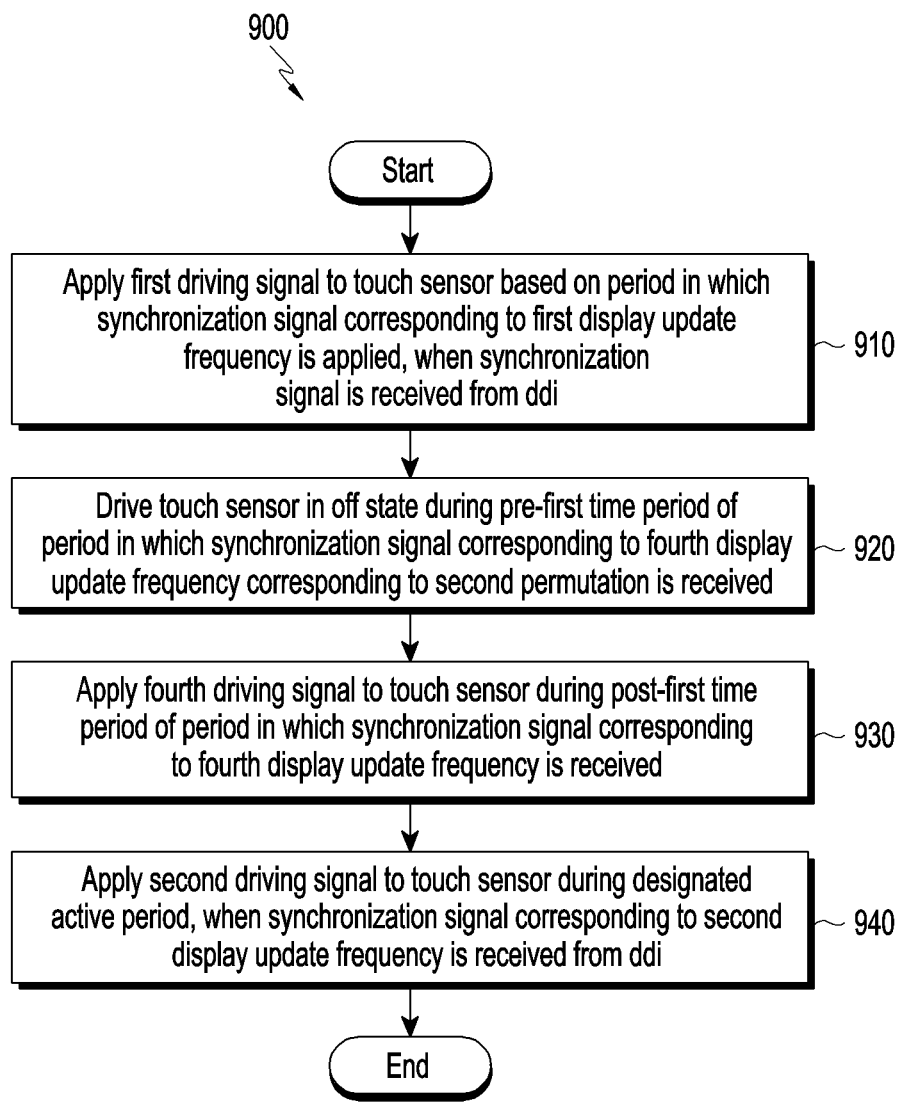
FIG. 9 is a flowchart illustrating operations of an electronic device according to an embodiment of the disclosure.
Figure 10:
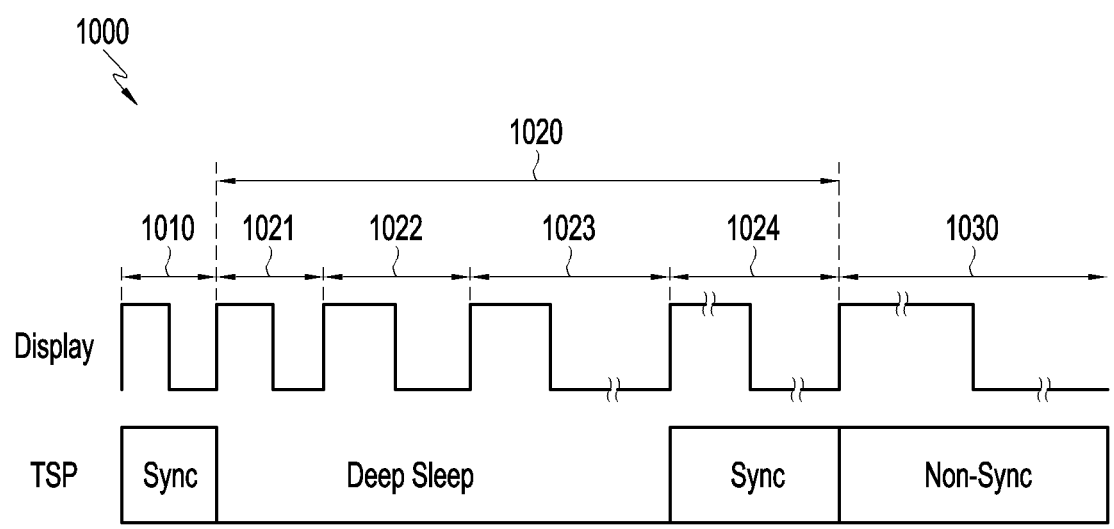
FIG. 10 illustrates a driving state of a display and a driving state of a touch sensor for describing operations of a touch circuit included in an electronic device, according to an embodiment of the disclosure.

FIG. 9 is a flowchart 900 illustrating operations of an electronic device according to an embodiment of the disclosure. FIG. 10 is a view 1000 illustrating a driving state of a display and a driving state of a touch sensor for describing operations of a touch circuit included in an electronic device, according to an embodiment of the disclosure. Specifically, FIGS. 9 and 10 illustrate an example in which the update frequency of the screen to be displayed on the display 210 is changed through the fourth display update frequency to the second display update frequency after the period of the first display update frequency, more specifically an example in which the touch sensor 251 is driven in an off state during a portion of the period in which the synchronization signal corresponding to the fourth display update frequency is received.

Referring to FIG. 9, in operation 910, the touch sensor IC (e.g., the touch sensor IC 253) included in the display device (e.g., the display device 160) of the electronic device (e.g., the electronic device 101) may apply a first driving signal to a touch sensor (e.g., the touch sensor 251) based on a period during which a synchronization signal is applied, when the synchronization signal corresponding to a first display update frequency is received from a DDI (e.g., the DDI 230). The details of operation 910 are the same as those described above with reference to operation 310, and no repetitive description thereof is given below.

In operation 920, the touch sensor IC 253 may drive the touch sensor 251 in an off state during a period before a first time of the period in which the synchronization signal corresponding to the fourth display update frequency corresponding to the second permutation is received. The details of the second permutation are the same as those described above with reference to operation 720, and no repetitive description thereof is given below. According to various embodiments of the disclosure, the first time may be a time at which a synchronization signal corresponding to a display update frequency corresponding to a divisor of the first integer is received after the first time. For example, in the example where the first display update frequency is 60 Hz, the second display update frequency is 1 Hz, the first integer is 60, the second integer is 1, and the second permutation is 56, 52, 48, . . . , 8, and 4, since 4 is a divisor of 60 but 8 is not a divisor of 60, the first time may be a time at which a synchronization signal corresponding to a display update frequency of 4 Hz starts to be received. In the example where the first display update frequency is 60 Hz, the second display update frequency is 1 Hz, the first integer is 60, the second integer is 1, and the second permutation is 56, 52, 48, . . . , 8, and 4, a time available as the first time point is only the time at which a synchronization signal corresponding to a display update frequency of 4 Hz starts being received, but according to various embodiments of the disclosure, a plurality of times available as the first time may exist, and among a plurality of candidates available as the first time, any one may be specified as the first time.

FIG. 10 illustrates the driving state display of the display 210 and the driving state TSP of the touch sensor 251 in the example in which the first display update frequency is 60 Hz and the second display update frequency is 1 Hz, and the second permutation is 56, 52, 48, . . . , 8, and 4. In the example of FIG. 10, a fourth display update frequency is 56 Hz, 52 Hz, 48 Hz, . . . , 8 Hz, or 4 Hz.

Referring to FIG. 10, the update frequency of the display 210 in the first period 1010 is 60 Hz, which is the first display update frequency. The update frequencies of the display 210 in the first frame 1021 and the second frame 1022 of the fourth period 1020, in which the update frequency of the display 210 is the fourth display update frequency, are 56 Hz and 52 Hz, respectively. As described above, given that the first time is a time at which the synchronization signal corresponding to the display update frequency of 4 Hz starts being received in the case where the first display update frequency is 60 Hz and the second permutation is 56, 52, 48, . . . , 8, and 4, the update frequency of the display 210 in the period 1024 after the first time, in the fourth period 1020 is 4 Hz. It will be readily appreciated by one of ordinary skill in the art that in the remaining period 1023 except for the first frame 1021, the second frame 1022, and the post-first time period 1024 of the fourth period 1020, although some periods are omitted for convenience of illustration, the update frequency of the display 210 will be sequentially changed in the order of 48 Hz, 44 Hz, . . . , 12 Hz, and 8 Hz.

In operation 930, the touch sensor IC 253 may apply the fourth driving signal to the touch sensor 251 during a period after the first time of the period in which the synchronization signal corresponding to the fourth display update frequency corresponding to the second permutation is received. The frequency of the fourth driving signal may be the same as the frequency of the first driving signal. In other words, the time interval between adjacent pulses of the fourth driving signal may be the same as the time interval between adjacent pulses of the first driving signal.

In operation 940, when a synchronization signal corresponding to a second display update frequency is received from the DDI 230, the touch sensor IC 253 may apply a second driving signal to the touch sensor during a designated active period. The details of operation 940 are the same as those described above with reference to operation 320, and no repetitive description thereof is given below.

Referring to the driving state TSP of the touch sensor 251 of FIG. 10, the touch sensor 251 may be driven by the first driving signal based on the synchronization signal as described above in connection with operation 310 in the first period 1010 (Sync), driven by the second driving signal as described above in connection with operation 320 in the second period 1030 (Non-Sync), driven in an off state in periods 1021, 1022, and 1023 before the first time of the fourth period 1020 (Deep Sleep), and driven by the fourth driving signal which has the same frequency as the first driving signal, in a period 1024 after the first time, of the fourth period 1020. According to various embodiments of the disclosure, in the pre-first time periods 1021, 1022, and 1023 of the fourth period 1020, the touch sensor 251 is in an on state, and at least one of the touch sensor IC 253 or the processor 120 may not change, into coordinates, the signal based on a touch input detected by the touch sensor 251 while the touch sensor 251 is in the on state.

Figure 11:
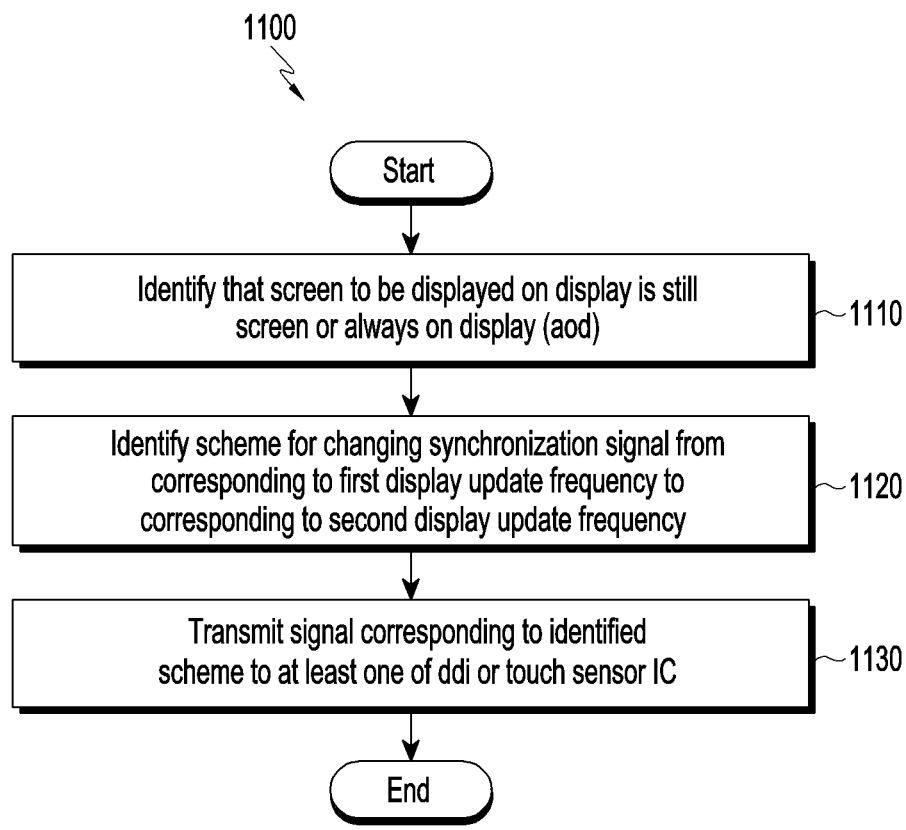
FIG. 11 is a flowchart illustrating operations of an electronic device according to an embodiment of the disclosure.

FIG. 11 is a flowchart 1100 illustrating operations of an electronic device according to an embodiment of the disclosure. Specifically, FIG. 11 illustrates operations performed by a processor (e.g., the processor 120) in a case where a DDI (e.g., the DDI 230) included in a display device (e.g., the display device 160) of an electronic device (e.g., the electronic device 101) supports a plurality of schemes among the above-described various schemes in which the display update frequency is changed from the first display update frequency to the second display update frequency.

Referring to FIG. 11, in operation 1110, the processor (e.g., the processor 120) may identify that the screen to be displayed on the display (e.g., the display 210) is a still screen or an always on display (AOD).

In operation 1120, the processor 120 may identify a scheme for changing the synchronization signal from corresponding to the first display update frequency to corresponding to the second display update frequency. According to various embodiments of the disclosure, the processor 120 may identify, as schemes to apply, a first scheme in which the synchronization signal is changed from corresponding to the first display update frequency immediately to corresponding to the second display update frequency, a second scheme in which the synchronization signal is changed to correspond to the third display update frequency corresponding to a permutation of divisors of a first integer before changed to correspond to the second display update frequency, and then changed to correspond to the second display update frequency, or a third scheme in which the synchronization signal is changed to correspond to the fourth display update frequency corresponding to a permutation, decreasing at equal intervals, before changed to correspond to the second display update frequency and then changed to correspond to the second display update frequency.

According to various embodiments of the disclosure, the processor 120 may identify the scheme to be applied, based on the specifications of the DDI 230. For example, according to various embodiments of the disclosure, the processor 120 may identify, as the scheme to be applied, the scheme supported by the DDI 230 among the above-described schemes to change the synchronization signal from corresponding to the first display update frequency to corresponding to the second display update frequency. According to various embodiments of the disclosure, when the DDI 230 supports a plurality of schemes, the processor 120 may identify one of the plurality of schemes supported by the DDI 230 as the scheme to be applied.

According to various embodiments of the disclosure, the processor 120 may identify the scheme to be applied, based on information about the sensitivity to the flicker of the display 210 of the user of the electronic device 101. According to various embodiments of the disclosure, the processor 120 may identify, as the scheme to be applied, the first scheme in which the synchronization signal is changed from corresponding to the first display update frequency immediately to corresponding to the second display update frequency only when the sensitivity of flicker of the display 210 of the user of the electronic device 101 is a predetermined first threshold or less. According to various embodiments of the disclosure, the processor 120 may identify, as the scheme to be applied, the third scheme in which the synchronization signal is changed to correspond to the fourth display update frequency corresponding to the permutation, decreasing at equal intervals, before changed to correspond to the second display update frequency and then changed to correspond to the second display update frequency when the sensitivity of flicker of the display 210 of the user of the electronic device 101 is a predetermined second threshold or more. According to various embodiments of the disclosure, the processor 120 may identify, as the scheme to be applied, the second scheme in which the synchronization signal is changed to correspond to the third display update frequency corresponding to a permutation of divisors of the first integer before changed to correspond to the second display update frequency and then changed to correspond to the second display update frequency when the sensitivity of flicker of the display 210 of the user of the electronic device 101 is identified to be within a predetermined range. According to various embodiments of the disclosure, gathering information about the sensitivity to the flicker of the display 210 of the user of the electronic device 101 is not limited to a specific method.

In operation 1130, the processor 120 may transmit a signal corresponding to the scheme identified in operation 1120 to at least one of the DDI 230 or the touch sensor IC 253. According to various embodiments of the disclosure, upon identifying, as the scheme to be applied, the first scheme in which the synchronization signal is changed from corresponding to the first display update frequency immediately to corresponding to the second display update frequency, the processor 120 may transmit a signal to allow the touch sensor IC 253 to receive the first signal indicating that the synchronization signal is to be changed to correspond to the second display update frequency in a frame immediately before a frame in which the display update frequency differs from the first display update frequency.

According to various embodiments of the disclosure, upon identifying, as the scheme to be applied, the second scheme in which the synchronization signal is changed to correspond to the third display update frequency corresponding to a permutation of divisors of a first integer before changed to correspond to the second display update frequency, and then changed to correspond to the second display update frequency, the processor 120 may transmit a signal to allow the touch sensor IC 253 to receive the first signal indicating that the synchronization signal is to be changed to correspond to the second display update frequency in a frame immediately before a frame in which the display update frequency is the second display update frequency.

According to various embodiments of the disclosure, upon identifying, as the scheme to be applied, the third scheme in which the synchronization signal is changed to correspond to the fourth display update frequency corresponding to a permutation, decreasing at equal intervals, before changed to correspond to the second display update frequency and then changed to correspond to the second display update frequency, the processor 120 may transmit a signal to allow the touch sensor IC 253 to receive the second signal indicating that the touch sensor 251 is driven in an off state in a frame immediately before a frame in which the display update frequency is different from the first display update frequency, transmits a signal to allow the touch sensor IC 253 to receive the third signal indicating application of the fourth driving signal to the touch sensor 251 in a frame immediately before the first time, and transmits a signal to allow the touch sensor IC 253 to receive the first signal indicating that the synchronization signal is to be changed to correspond to the second display update frequency in a frame immediately before a frame in which the display update frequency is the second display update frequency.

According to various embodiments of the disclosure, the first signal, the second signal, and the third signal described above may be transmitted from the processor 120 to the touch sensor IC 253. Alternatively, according to various embodiments of the disclosure, the first signal, the second signal, and the third signal described above may be transmitted from the DDI 230 to the touch sensor IC 253.

According to various embodiments of the disclosure, an electronic device 101 comprises a display 210, a DDI 230 configured to output a synchronization signal corresponding to an update of a screen to be displayed on the display, and a touch circuit 250 including a touch sensor 251 and a touch sensor IC 253. The touch sensor IC 253 may be configured to apply a first driving signal to the touch sensor 251, based on a period in which a synchronization signal corresponding to a first display update frequency is applied, when the synchronization signal is received from the DDI 230, and apply a second driving signal to the touch sensor 251, during a designated active period, when a synchronization signal corresponding to a second display update frequency is received from the DDI 230.

According to various embodiments of the disclosure, in the active period, a frequency of the second driving signal may be higher than a frequency of the first driving signal.

According to various embodiments of the disclosure, before the synchronization signal corresponding to the second display update frequency is received from the DDI 230, the touch sensor IC 253 may be configured to receive, from the DDI 230, a synchronization signal corresponding to a third display update frequency corresponding to a first permutation, the first permutation being a decreasing permutation of at least one of integers which are divisors of a first integer corresponding to the first display update frequency and greater than a second integer corresponding to the second display update frequency, and apply a third driving signal to the touch sensor 251 while the synchronization signal corresponding to the third display update frequency is received. A frequency of the third driving signal may be identical to a frequency of the first driving signal.

According to various embodiments of the disclosure, before the synchronization signal corresponding to the second display update frequency is received from the DDI 230, the touch sensor IC 253 may be configured to receive, from the DDI 230, a synchronization signal corresponding to a fourth display update frequency corresponding to a second permutation, the second permutation being a decreasing permutation of a plurality of integers which start with a third integer less than a first integer corresponding to the first display update frequency and end with a fourth integer less than the third integer and greater than a second integer corresponding to the second display update frequency, and drive the touch sensor 251 in an off state during at least a portion of a period in which the synchronization signal corresponding to the fourth display update frequency is received.

According to various embodiments of the disclosure, the touch sensor IC 253 may be configured to drive the touch sensor 251 in the off state during a period before a first time, of the period in which the synchronization signal corresponding to the fourth display update frequency is received, and apply a fourth driving signal to the touch sensor 251 during a period after the first time, of the period in which the synchronization signal corresponding to the fourth display update frequency is received. A frequency of the fourth driving signal may be identical to a frequency of the first driving signal. The first time may be a time at which a synchronization signal received after the first time corresponds to a display update frequency corresponding to a divisor of the first integer.

According to various embodiments of the disclosure, the electronic device 101 may further comprise a processor. The processor may be configured to identify a scheme for changing the synchronization signal from corresponding to the first display update frequency to corresponding to the second display update frequency.

According to various embodiments of the disclosure, the processor may be configured to identify the scheme based on a specification of the DDI 230.

According to various embodiments of the disclosure, the processor may be configured to identify the scheme based on information regarding a sensitivity for a flicker of the display 210 of a user of the electronic device 101.

According to various embodiments of the disclosure, the touch sensor IC 253 may be configured to receive a first signal indicating that the synchronization signal is to be changed to correspond to the second display update frequency before receiving, from the DDI 230, the synchronization signal corresponding to the second display update frequency.

According to various embodiments of the disclosure, the electronic device 101 may further comprise a processor. The processor may be configured to transmit the first signal to the touch sensor IC 253 based on identifying that the screen to be displayed on the display is a still screen or an always on display (AOD).

According to various embodiments of the disclosure, the synchronization signal may include a horizontal synchronization signal. The touch sensor IC 253 may be configured to identify that the synchronization signal is changed to correspond to the second display update frequency, based on identifying that the horizontal synchronization signal is not received during a predetermined first time interval.

According to various embodiments of the disclosure, the first display update frequency may be 60 Hz, and the second display update frequency may be 1 Hz.

According to various embodiments of the disclosure, a method for driving a touch sensor 251, performed by a touch sensor IC 253 included in an electronic device 101 may comprise applying a first driving signal to the touch sensor 251, based on a period in which a synchronization signal corresponding to a first display update frequency is applied, when the synchronization signal is received, and applying a second driving signal to the touch sensor 251, during a designated active period, when a synchronization signal corresponding to a second display update frequency is received.

According to various embodiments of the disclosure, in the active period, a frequency of the second driving signal may be higher than a frequency of the first driving signal.

According to various embodiments of the disclosure, the method may further comprise, before the synchronization signal corresponding to the second display update frequency is received, receiving a synchronization signal corresponding to a third display update frequency corresponding to a first permutation, the first permutation being a decreasing permutation of at least one of integers which are divisors of a first integer corresponding to the first display update frequency and greater than a second integer corresponding to the second display update frequency, and applying a third driving signal to the touch sensor 251 while the synchronization signal corresponding to the third display update frequency is received. a frequency of the third driving signal is identical to a frequency of the first driving signal.

According to various embodiments of the disclosure, the method may comprise, before the synchronization signal corresponding to the second display update frequency is received, receiving a synchronization signal corresponding to a fourth display update frequency, the second permutation being a decreasing permutation of a plurality of integers which start with a third integer less than a first integer corresponding to the first display update frequency and end with a fourth integer less than the third integer and greater than a second integer corresponding to the second display update frequency, and driving the touch sensor 251 in an off state during at least a portion of a period in which the synchronization signal corresponding to the fourth display update frequency is received.

According to various embodiments of the disclosure, driving the touch sensor 251 in the off state during at least the portion of the period in which the synchronization signal corresponding to the fourth display update frequency is received may include driving the touch sensor 251 in the off state during a period before a first time, of the period in which the synchronization signal corresponding to the fourth display update frequency is received, and applying a fourth driving signal to the touch sensor 251 during a period after the first time, of the period in which the synchronization signal corresponding to the fourth display update frequency is received. A frequency of the fourth driving signal may be identical to a frequency of the first driving signal. The first time may be a time at which a synchronization signal received after the first time corresponds to a display update frequency corresponding to a divisor of the first integer.

According to various embodiments of the disclosure, it is possible to identify a scheme for changing the synchronization signal from corresponding to the first display update frequency to corresponding to the second display update frequency.

According to various embodiments of the disclosure, the scheme may be identified based on a specification of the DDI 230.

According to various embodiments of the disclosure, the scheme may be identified based on information regarding a sensitivity for a flicker of the display 210 of a user of the electronic device 101.

According to various embodiments of the disclosure, the method may further comprise receiving a first signal indicating that the synchronization signal is to be changed to correspond to the second display update frequency before receiving the synchronization signal corresponding to the second display update frequency.

According to various embodiments of the disclosure, the first signal may be transmitted to the touch sensor IC 253 based on identifying that the screen to be displayed on the display 210 is a still screen or an always on display (AOD).

According to various embodiments of the disclosure, the synchronization signal may include a horizontal synchronization signal. The method may further comprise identifying that the synchronization signal is changed to correspond to the second display update frequency, based on identifying that the horizontal synchronization signal is not received during a predetermined first time interval.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a display driver integrated circuit (IC) (DDI) configured to output a synchronization signal corresponding to an update of a screen to be displayed on the display; and
a touch circuit including a touch sensor and a touch sensor IC, wherein the touch sensor IC is configured to:
receive, from the DDI, a first synchronization signal corresponding to a first display update frequency of a moving image, the first synchronization signal comprising a first vertical synchronization signal and a first horizontal synchronization signal,
generate a first driving signal for the touch sensor based on the first vertical synchronization signal and the first horizontal synchronization signal, the first driving signal generated to not overlap with the first vertical synchronization signal and the first horizontal synchronization signal,
apply the first driving signal to the touch sensor, during a first period in which the first synchronization signal corresponding to the first display update frequency is applied,
receive a second synchronization signal corresponding to a second display update frequency of a still image from the DDI, the second synchronization signal comprising a second vertical synchronization signal,
generate a second driving signal for the touch sensor based on the second vertical synchronization signal, the second driving signal generated to not overlap with the second vertical synchronization signal, and
apply the second driving signal to the touch sensor, during a designated active period in a second period and stop applying the second driving signal to the touch sensor during a dormant period in the second period,
wherein, in the active period, a frequency of the second driving signal is higher than a frequency of the first driving signal.

2. The electronic device of claim 1,
wherein, before the second synchronization signal corresponding to the second display update frequency is received from the DDI, the touch sensor IC is further configured to:
receive, from the DDI, a third synchronization signal corresponding to a third display update frequency corresponding to a first permutation, the first permutation being a decreasing permutation of at least one of integers which are divisors of a first integer corresponding to the first display update frequency and greater than a second integer corresponding to the second display update frequency, and
apply a third driving signal to the touch sensor while the third synchronization signal corresponding to the third display update frequency is received, and
wherein a frequency of the third driving signal is identical to a frequency of the first driving signal.

3. The electronic device of claim 1, wherein, before the second synchronization signal corresponding to the second display update frequency is received from the DDI, the touch sensor IC is further configured to:
receive, from the DDI, a fourth synchronization signal corresponding to a fourth display update frequency corresponding to a second permutation, the second permutation being a decreasing permutation of a plurality of integers which start with a third integer less than a first integer corresponding to the first display update frequency and end with a fourth integer less than the third integer and greater than a second integer corresponding to the second display update frequency; and
drive the touch sensor in an off state during at least a portion of a period in which the fourth synchronization signal corresponding to the fourth display update frequency is received.

4. The electronic device of claim 3,
wherein the touch sensor IC is further configured to:

drive the touch sensor in the off state during a period before a first time, of the period in which the fourth synchronization signal corresponding to the fourth display update frequency is received, and apply a fourth driving signal to the touch sensor during a period after the first time, of the period in which the fourth synchronization signal corresponding to the fourth display update frequency is received, wherein a frequency of the fourth driving signal is identical to a frequency of the first driving signal, and wherein the first time is a time at which a synchronization signal received after the first time corresponds to a display update frequency corresponding to a divisor of the first integer.

5. The electronic device of claim 1, further comprising a processor, wherein the processor is configured to identify a scheme for changing the first synchronization signal corresponding to the first display update frequency to the second synchronization signal corresponding to the second display update frequency.

6. The electronic device of claim 5, wherein the processor is further configured to identify the scheme based on a specification of the DDI.

7. The electronic device of claim 5, wherein the processor is further configured to identify the scheme based on information regarding a sensitivity for a flicker of the display of a user of the electronic device.

8. The electronic device of claim 5, wherein the touch sensor IC is further configured to receive a first signal indicating that the first synchronization signal is to be changed to the second synchronization signal corresponding to the second display update frequency before receiving, from the DDI, the second synchronization signal corresponding to the second display update frequency.

9. The electronic device of claim 8, wherein the processor is further configured to transmit the first signal to the touch sensor IC based on identifying that the screen to be displayed on the display is a still screen or an always on display (AOD).

10. The electronic device of claim 1, wherein the touch sensor IC is further configured to identify that the first synchronization signal is changed to the second synchronization signal corresponding to the second display update frequency, based on identifying that the first horizontal synchronization signal is not received during a predetermined first time interval.

11. The electronic device of claim 1, wherein the first display update frequency is 60 Hz, and the second display update frequency is 1 Hz.

12. The electronic device of claim 1, wherein the first synchronization signal corresponding to the update of the screen to be displayed on the display received from the DDI by the touch sensor IC further comprises at least one of a data enable (DE) signal or a tearing effect (TE) signal.

13. A method for driving a touch sensor, performed by a touch sensor integrated circuit (IC) included in an electronic device, the method comprising:

receiving, by the touch sensor IC, from a display driver IC (DDI), a first synchronization signal corresponding to a first display update frequency of a moving image, the first synchronization signal comprising a first vertical synchronization signal and a first horizontal synchronization signal;

generating, by the touch sensor IC, a first driving signal for the touch sensor based on the first vertical synchronization signal and the first horizontal synchronization signal, the first driving signal generated to not overlap with the first vertical synchronization signal and the first horizontal synchronization signal, applying the first driving signal to the touch sensor, during a first period in which the first synchronization signal corresponding to the first display update frequency is applied;

receiving a second synchronization signal corresponding to a second display update frequency of a still image from the DDI, the second synchronization signal comprising a second vertical synchronization signal;

generating a second driving signal for the touch sensor based on the second vertical synchronization signal, the second driving signal generated to not overlap with the second vertical synchronization signal; and applying the second driving signal to the touch sensor, during a designated active period in a second period and stopping applying of the second driving signal to the touch sensor during a dormant period in the second period, wherein, in the active period, a frequency of the second driving signal is higher than a frequency of the first driving signal.

14. The method of claim 13, further comprising:

before the second synchronization signal corresponding to the second display update frequency is received:

receiving a third synchronization signal corresponding to a third display update frequency corresponding to a first permutation, the first permutation being a decreasing permutation of at least one of integers which are divisors of a first integer corresponding to the first display update frequency and greater than a second integer corresponding to the second display update frequency, and applying a third driving signal to the touch sensor while the third synchronization signal corresponding to the third display update frequency is received, wherein a frequency of the third driving signal is identical to a frequency of the first driving signal.

15. The method of claim 13, wherein the first synchronization signal corresponding to the first display update frequency received from the DDI by the touch sensor IC further comprises at least one of a data enable (DE) signal or a tearing effect (TE) signal.

* * * * *